3,435,493
MANUFACTURE OF POTTERY
Frank William Meadows and Arthur Dowley, Stoke-on-Trent, England, assignors to Service (Engineering) Limited, Stoke-on-Trent, Staffordshire, England, a British company
Filed Feb. 16, 1966, Ser. No. 527,924
Claims priority, application Great Britain, Feb. 27, 1965, 8,536/65
Int. Cl. B28b 3/26
U.S. Cl. 25—22   12 Claims

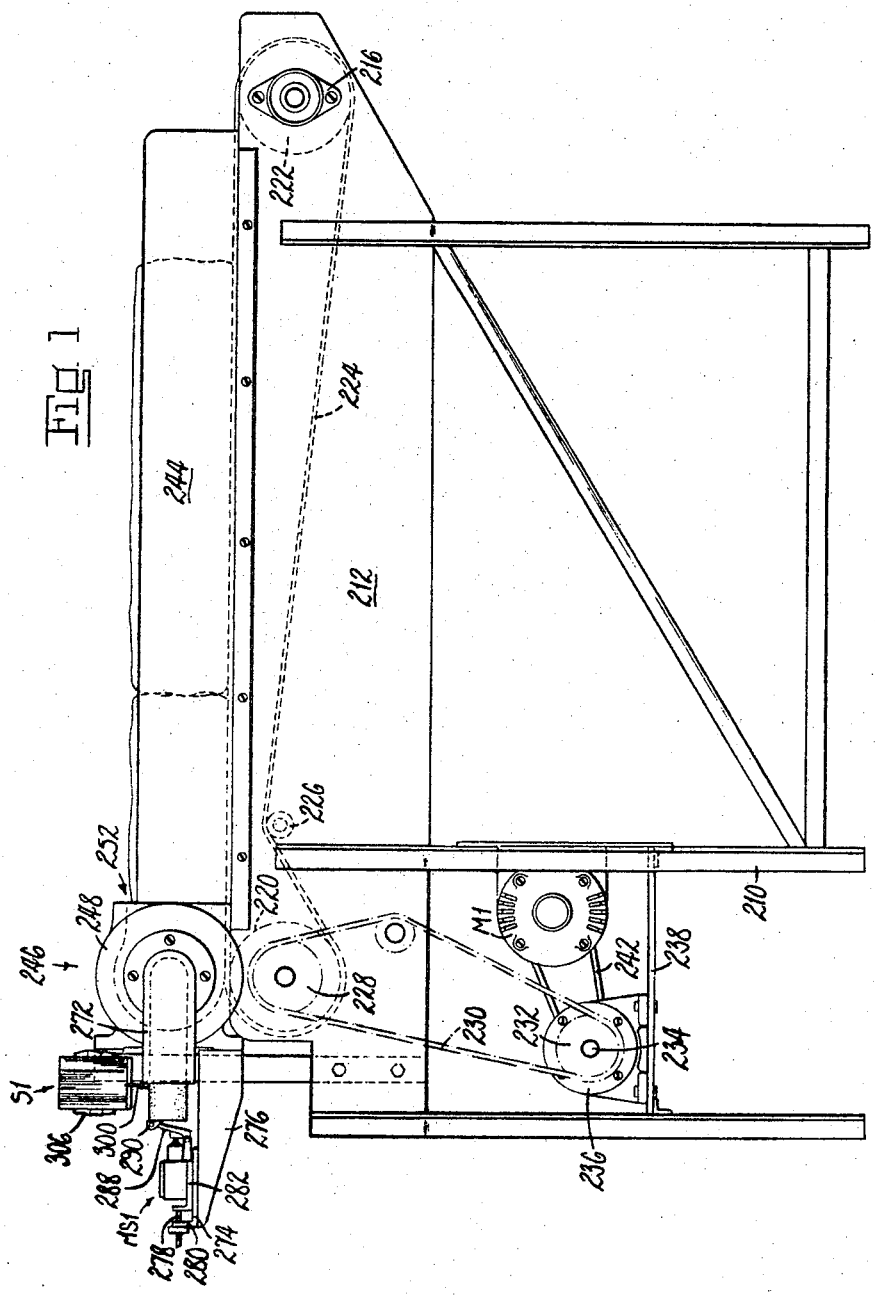

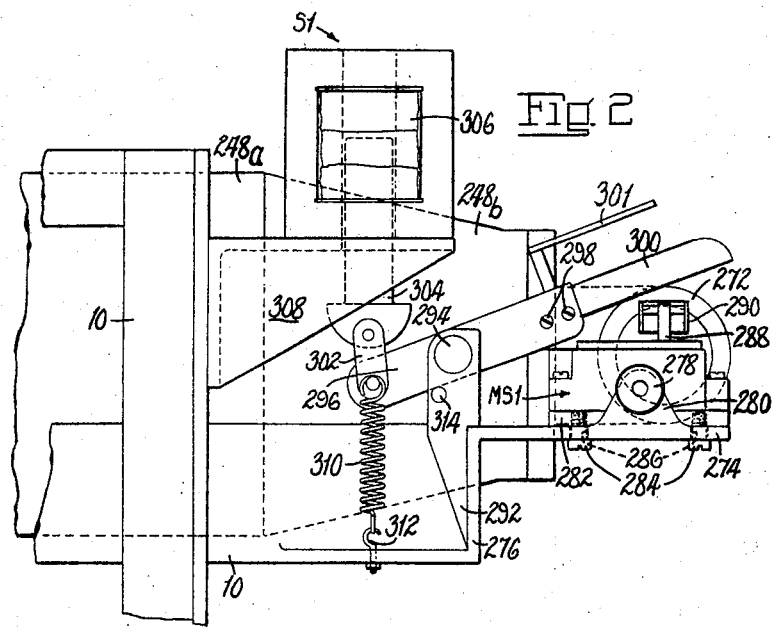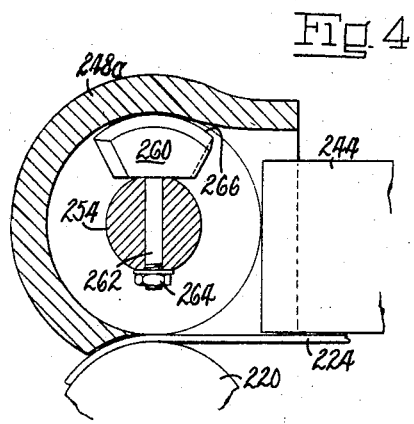

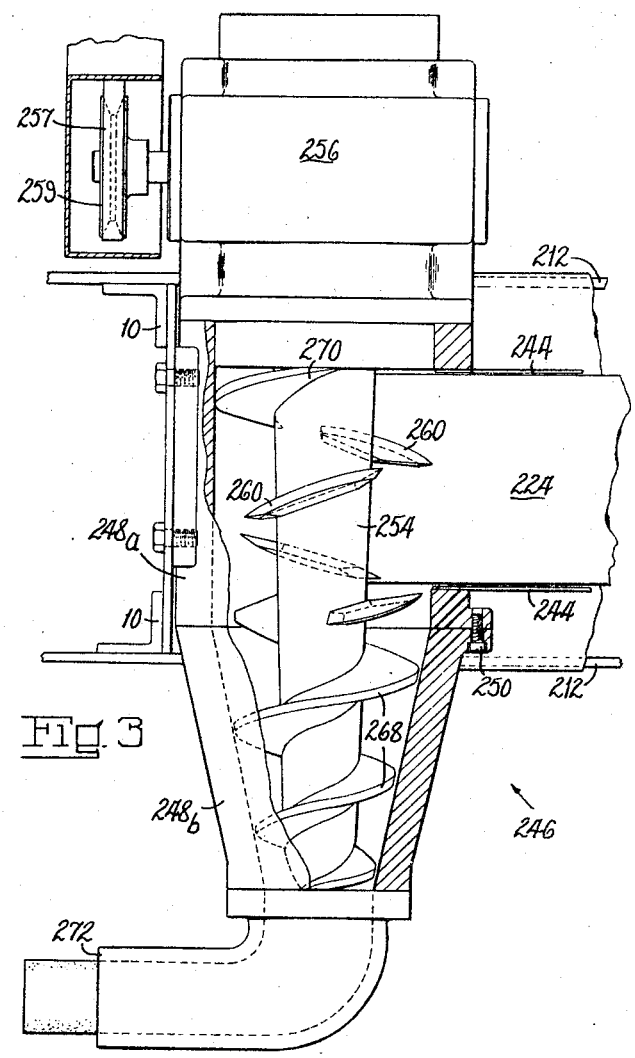

ABSTRACT OF THE DISCLOSURE

A machine for feeding uniformly metered quantities of clay including an extruder into which clay is fed from a conveyor, to be extruded therefrom at an outlet. A device is arranged at the outlet for cutting off successive metered quantities of clay fed therefrom, and operation of the extruder and conveyor is discontinued when a metered quantity of clay has been extruded.

---

This invention is concerned with improvements in or relating to the manufacture of pottery ware.

In the pottery industry it is quite often the case that, when making articles of hollow ware, a quantity is picked up by hand from a supply of clay and is placed in a mould prior to the operation of a forming tool to shape the clay to the inside contour of the mould, and, when making articles of flatware, a quantity of clay is similarly picked up by hand and placed on a work support of a so-called batting out machine to shape it into a disc which is thereafter placed on a mould to be shaped to the contour thereof. In both cases, the operator is required to be highly competent in estimating the quantity of clay which he picks up, otherwise a large amount of wastage of clay will occur, if he consistently picks up too large a quantity, or, if he fails to pick up a sufficiently large quantity, the article of ware will be spoiled.

Also in use in the pottery industry are clay feeding devices, one of which is used, for example, in combination with a flatware making machine and comprises a frame on which is mounted a horizontal, or substantially horizontal, conveyor on which is supported a column of clay formed from pugs successively placed thereon. Adjacent one end of the conveyor a clay cutter in the form of a piano wire stretched between two side members is mounted for up and down movement to carry it through the path taken by the column of clay on the conveyor as the conveyor moves. Intermittent movement of the conveyor and the up and down movement of the clay cutter are controlled by a common cam shaft driven by a motor of the device. Mounted in front of and below the clay cutter is a work-table which is resiliently mounted so that a micro-switch engaged by the work-table is actuated when the work-table is loaded by placing a mould thereon. In using this clay feeding device, however, it is desirable that successive pugs of clay placed on the conveyor thereof abut against one another in order that a slice of clay cut from a portion of the column where two pugs are adjacent one another is of sufficient thickness for use in making an article; otherwise either the slice has to be discarded with a result that, for example, where the feeding device forms part of an automatic production line, one cycle of operation of the line is in effect unused, or an article of ware formed from the slice is spoiled.

Furthermore while the clay feeding device referred to above operates satisfactorily with flatware making machines which generally operate at speeds of up to twelve pieces per minute, such a device is not satisfactory for use in the making of cups for example in an automatic cup making apparatus as disclosed in United States application for Letters Patent Serial No. 616,129, filed February 14, 1967, as a continuation of application Ser. No. 469,548, filed July 6, 1965, now abandoned, by Frank William Meadows and Dennis Podmore, which apparatus operates at speeds of up to twenty pieces per minute. In addition pugs of clay are customarily of the order of six inches in diameter and it would not be possible to feed pieces thereof cut by the clay feeding device above referred to directly into cup making moulds. However, from the point of view of clay handling, the clay feeding device above referred to has an advantage in that the pugs are placed end to end on a horizontal conveyor.

It is one of the various objects of the present invention to provide an improved clay feeding device which, while ensuring easy handling of pugs of clay placed thereon, is also effective quickly and efficiently to feed successive uniformly metered quantities of clay.

There is hereinafter described in detail, to illustrate the invention by way of example, a device suitable for use in feeding uniformly metered quantities of clay, which device will be described for use with an apparatus for making articles of hollow ware, including a turntable, a making machine at one station of the turntable, and a drying cabinet as disclosed in United States application for Letters Patent Ser. No. 616,129, filed February 14, 1967, by Frank William Meadows and Dennis Podmore.

The illustrative device comprises an extruder having in a side wall portion thereof an inlet into which clay is fed, a conveyor arranged to feed pugs of clay placed thereon into the inlet of the extruder, means including a micro-switch arranged opposite an outlet nozzle of the extruder and an arm engageable by a leading end portion of a quantity of clay as it is fed from the outlet nozzle of the extruder, and movable thereby to an actuating position, whereby, in the operation of the illustrative device, operation of the extruder and conveyor is discontinued to prevent further clay being fed from the outlet nozzle, and a clay cut-off device arranged adjacent the extruder outlet nozzle for cutting off successive metered quantities of clay fed therefrom.

The clay cut-off device of the illustrative device is arranged to be operated when a mould is brought by the turntable of the aforementioned apparatus to a position beneath the outlet nozzle whereby the quantity of clay fed as aforesaid is cut off and drops into the mould. Cutting of the clay is effective to allow the microswitch to return to its former position and the clay feeding operation of the conveyor and extruder is continued.

In using the illustrative device, uniformity in the metered quantities of clay fed in successive operations of the device is maintained, or substantially so. Furthermore, the conveyor compacts the clay as it is fed into the extruder and is generally effective to close up any gaps between successive pugs of clay placed on the conveyor.

Once the quantity of clay to be used for a particular article of pottery ware has been decided upon, accurate metering of the clay enables excessive waste of clay on the one hand to be overcome while, on the other hand, there is little or no risk of too little clay being fed to a mould with consequent spoiling of the ware or of the mould or both.

The invention provides a device for feeding uniformily metered quantities of clay comprising an extruder having in a side wall portion thereof an inlet into which clay is fed, means for causing the extruder to operate to feed clay from the inlet thereof and extrude it at an outlet thereof, a conveyor arranged at the extruder inlet, means for driving the conveyor to feed pugs of clay placed thereon into the extruder inlet, means whereby operation of the extruder is discontinued when a metered quantity of clay has been extruded from the extruder outlet, and a clay cut-off device arranged at the extruder outlet for cutting off successive metered quantities of clay fed therefrom.

There now follows a detailed description, to be read with reference to the accompanying drawings, of the illustrative device. It will, of course, be realised that this illustrative device has been selected by way of exemplification of the invention and not by way of limitation thereof.

In the accompanying drawings:

FIGURE 1 is a view in side elevation of the illustrative device showing a conveyor, an extruder and a clay cut-off device thereof;

FIGURE 2 is a front view of the clay cut-off device shown in FIGURE 1;

FIGURE 3 is a sectional view of the extruder of the illustrative device; and

FIGURE 4 is a fragmentary view showing, in section, a blade member mounted in a shaft of the extruder.

The illustrative device comprises a main frame 210 having bolted thereto side members 212 in which are mounted bearings for cross shafts 214, 216. The shafts 214, 216 respectively support rollers 220, 222 which in turn support a horizontal endless conveyor belt 224, a roller 226 being mounted on a shaft 218 supported in the side members 212 for tensioning the conveyor belt 224. The shaft 214 has supported thereon a pulley 228 connected by means of a belt 230 to a pulley 232 secured on a shaft 234 of a gear box 236 mounted on a table 238 forming part of the main frame 210. The gear box 236 is driven by an electric motor 240 mounted on the main frame 210, through a belt 242.

Secured on to each side member 212, at the upper end thereof, is a wall member 244, the two wall members forming a channel the floor of which is provided by the conveyor belt 224 and into which pugs of clay can be placed by the operator. At the left hand end (viewing FIGURE 1) of the channel is arranged, mounted on the main frame of the illustrative device, an extruder generally designated 246 and comprising a casing 248 (FIGURE 3) defining a chamber and constituted by a cylindrical portion 248a and a frusto-conical portion 248b secured thereto by means of bolts 250, the wall of the cylindrical portion 248a being cut away to provide an inlet 252 which opens into the channel formed by the wall members 244. The extruder 246 also comprises a de-airing arrangement (not shown) located between the two chamber portions 248a, 248b. The conveyor belt 224 extends beneath the extruder in the region of the cut away portion of the wall and provides a floor for the chamber of the extruder in that region, the floor being continuous, or substantially continuous, with the inner face of the wall of the cylindrical portion 248a of the casing adjacent the cut away portion.

Mounted for rotation in the extruder casing 248, about the axis thereof, is a shaft 254 supported in bearings (not shown) in a gear box 256 secured by means of bolts 258 to an end wall of the cylindrical portion 248a of the casing. Secured on the shaft 254 and forming a spiral about the periphery thereof in the cylindrical portion 248a are a plurality of blade members 260 (FIGURES 3 and 4), each blade member being formed on a stem 262 which extends through the shaft 254 and on a threaded end portion of which is screwed a nut 264 to secure it to the shaft. Each blade member 260 is provided with an arcuate edge 266 shaped to correspond to the curvature of the inner face of the wall of the cylindrical portion 248a, the edge 266 being tapered towards the end portion thereof which leads as the shaft 254 is rotated. The blade members 260 are each inclined at an angle of 22° to a plane which is normal to the axis of the shaft 254 and also normal to the axis of the stem 262, the inclination of the members 260 being such as to form a right hand spiral. The portion of the shaft 254 (FIGURE 3) accommodated in the frusto-control portion 248b of the casing 248 has formed integral therewith a continuous right hand screw 268, being a continuation of the spiral formed by the blade members 260 but of larger pitch. The end portion of the shaft adjacent the end wall of the cylindrical portions 248a is provided with an integral scraper blade 270. For driving the shaft 254, the gear box 256 is provided with a pulley 257 operatively connected by means of a belt 259 to an electric motor (not shown) supported on the main frame.

Secured to the end of the casing 248 remote from the gear box 256 is a right angle tubular member constituting an outlet nozzle 272 through which clay can be fed by the action of the screw 268 and blade members 260 of the extruder. Mounted on a table 274 secured on a forwardly extending plate 276 forming part of the main frame 210 of the illustrative device opposite the outlet nozzle 272 of the extruder 246 is a microswitch MS1 adjustable towards and away from the outlet nozzle by means of an adjusting screw 278 captive in an upstanding lug 280 formed integral with the table 274 and engaging in a threaded bore formed in a slide 282 which carries the microswitch and is arranged to slide on the upper surface of the table, screws 284 threaded into the undersurface of the slide and projecting downwardly through slots 286 formed in the table 274 therefor being provided for causing the slide 282 to move along a rectilinear path. Also carried on the slide 282, for limited pivotal movement thereon, is an actuator arm 288 provided with a foot 290 arranged to engage with a leading end portion of clay fed from the outlet nozzle 272 of the extruder, the arrangement being such that pivotal movement of the actuator arm 288 is effective to operate the microswitch MS1.

Also mounted on the plate 276 of the main frame 210 of the illustrative device are two upstanding brackets 292 carrying at the upper end portions thereof a pin 294 extending therebetween and pivotally supporting a lever 296 at an intermediate portion thereof. At the right hand end of the lever (viewing FIGURE 2) is secured by means of two screws 298 a blade 300, the arrangement being such that as the lever is caused to pivot on the pin 294 the blade passes across the outlet nozzle 272 of the extruder in close proximity therewith. Mounted on the lever 296, and extending above the blade 300 over half its length and disposed normally thereto, is a pusher arm 301 so arranged that, as the lever 296 is caused to pivot as aforesaid, the pusher arm engages the clay as it is cut by the blade 300 and urges it downwardly. The other end portion of the lever 296 is pivotally connected to, and located between, end portions of two short links 302 the other end portions of which are pivotally connected to a head portion of a rod 304 constituting the core of a solenoid S1 the coil 306 of which is mounted above the said other end portion of the lever 296 on a bracket 308 bolted to the main frame 210. A spring 310 is arranged between the said other end portion of the lever 296 and a hook 312 on the main frame to urge the lever in an anticlockwise direction (viewing FIGURE 2) about the pin 294, energizing the solenoid being effective to cause the lever 296 to pivot in a clockwise direction thereabout. A stop pin 314 is provided between the brackets 292 for limiting anticlockwise movement of the lever 296 under the influence of the spring 310.

Whereas the outlet nozzle 272 of the extruder of the illustrative device is constituted by a right angle tubular member, other devices which are otherwise similar to the illustrative device and are in accordance with the invention, may be provided with extruders the outlet nozzles of which are constituted by straight tubular members secured to the outlet end of the extruder or are provided by the structure of the outlet end of the extruder itself.

Conveniently in the operation of the illustrative device, in conjunction with the apparatus disclosed in the aforementioned United States application, the turntable of the apparatus operates intermittently to bring successive mould to a clay feeding station at which the illustrative device is located, the moulds being positioned beneath the outlet nozzle 272 of the extruder 246. As the turntable operates as aforesaid, the conveyor belt 224 of the illustrative device is caused to move to feed clay into the inlet 252 of the extruder 246, the shaft 254 of which is at the same time caused to rotate, thus feeding clay from the outlet nozzle 272 thereof until the leading end portion of the clay engages with the foot 290 of the actuator arm 288 and the microswitch MS1 is actuated. Actuation of the microswitch is effective to cause electric current to the motors of the conveyor belt 224 and extruder shaft 254 respectively to be cut off whereby the feeding of the clay is discontinued.

When the turntable of the apparatus brings a mould into the clay feeding station, a second microswitch (not shown) is tripped by an upper portion of the mould whereby to energize the solenoid S1 to cause the blade 300, and the pusher arm 301 therewith, to pivot in a clockwise direction (viewing FIGURE 2) across the outlet nozzle 272 of the extruder and thus the quantity of clay fed therethrough is cut off and drops into the mould positioned therebeneath. The second microswitch is so arranged that if no mould is brought into the clay feeding station by the turntable, the microswitch is not tripped and therefore the quantity of clay will not be cut off as aforesaid. The quantity of clay cut off in each operation can of course be varied by means of the adjusting screw 278 which varies the position of the microswitch MS1 and actuator arm 288.

When a quantity of clay has been cut off as aforesaid, the microswitch MS1 is returned to its former position and the conveyor belt 224 and extruder 246 recommence their clay feeding operation. At the same time the turntable of the apparatus is operated to carry the mould to which clay has been fed to a subsequent station at which a making machine is located and thereafter, in successive cycles of operation of the apparatus, through the drying stations of the apparatus.

The illustrative device is further so arranged that if insufficient clay is fed from the outlet nozzle 272 and the microswitch MS1 is thus not operated when a mould is brought to the clay feed station by the turntable, the operation of the apparatus is discontinued until sufficient clay has been fed. In this way the risk of damage to a mould passing through the drying stations of the apparatus because insufficient clay has been fed thereto is substantially overcome.

Having thus described our invention, what we claim as new and desire to secure by Letters Patent of the United States is:

1. A device for feeding uniformly metered quantities of clay comprising an extruder having wall portions forming a casing, a side wall portion of said casing having an inlet into which clay is fed means for causing the extruder to operate to feed clay from the inlet thereof and extrude it at an outlet thereof, a conveyor arranged at the extruder inlet and having a continuous belt with a portion disposed at said inlet to substantially form part of said extruder casing, means for driving the conveyor to feed pugs of clay placed thereon into the extruder inlet, means whereby operation of the extruder is discontinued when a metered quantity of clay has been extruded from the extruder outlet, and a clay cut-off device arranged at the extruder outlet for cutting off successive metered quantities of clay fed therefrom.

2. A device according to claim 1 wherein the means whereby operation of the extruder is discontinued comprises an arm mounted in the path of the quantity of clay as it is fed from the extruder outlet and movable, on engagement by the clay, to an actuating position in which it is effective to cause operation of the extruder to be discontinued.

3. A device according to claim 2 wherein the extruder is driven by an electric motor and the arm is effective, when moved to its actuating position, to operate a switch to cause the operation of the extruder to be discontinued.

4. A device according to claim 2 wherein the position of the arm is adjustable towards and away from the outlet of the extruder.

5. A device according to claim 1 where the means whereby operation of the extruder is discontinued is also effective to cause operation of the conveyor to be discontinued.

6. A device according to claim 1 wherein the conveyor is horizontal.

7. A device according to claim 1 wherein the clay cut-off device comprises a blade member mounted on a main frame of the device for heightwise movement relative to the extruder outlet and in close proximity therewith.

8. A device according to claim 7 wherein the clay cut-off device also comprises a pusher arm mounted above the blade member and arranged, when the blade member is caused to operate, to urge the quantity of clay which is cut off downwardly.

9. A device according to claim 7 comprising means whereby the clay cut-off device is caused to operate only when a mould is positioned beneath the outlet of the extruder to receive the cut portion.

10. A device according to claim 9 wherein the blade member is moved heightwise upon actuation of a solenoid, actuation of the solenoid being effected when a switch associated with the cut-off device is operated by a mould being positioned beneath the said outlet.

11. A device according to claim 1 wherein the extruder comprises a first chamber portion and a second chamber portion between which is arranged de-airing means and through which passes a shaft, a plurality of blade members being mounted on the shaft and forming a spiral thereon, in the first chamber portion, and a continuous screw being mounted on the shaft, in the second chamber portion, the extruder inlet being formed in a side wall portion of the first chamber portion, and the second chamber portion being tapered towards its outlet end.

12. A device according to claim 10 wherein each blade member mounted on the shaft is provided with an arcuate edge which tapers towards the end thereof which leads when the shaft is rotated.

References Cited

UNITED STATES PATENTS

| | | | |
|---|---|---|---|
| 1,996,930 | 4/1935 | McClintock | 25—11 |
| 2,481,326 | 9/1949 | Miller | 25—11 X |
| 2,506,377 | 5/1950 | Miller | 25—11 X |
| 2,310,858 | 2/1943 | Miller | 25—22 X |
| 2,310,859 | 2/1943 | Miller | 25—22 X |
| 2,444,943 | 7/1948 | Miller | 25—22 X |
| 2,480,062 | 8/1949 | Wahl et al. | 25—22 X |
| 2,484,506 | 10/1949 | Hawk | 25—22 X |
| 2,489,796 | 11/1949 | Miller | 25—22 |
| 2,494,112 | 1/1950 | Wahl | 25—22 |

WILLIAM J. STEPHENSON, *Primary Examiner.*

U.S. Cl. X.R.

25—11